United States Patent Office 2,924,509
Patented Feb. 9, 1960

2,924,509

PROCESS FOR THE MANUFACTURE OF ALUMINUM PHOSPHATE

Hans Huber, Wiesbaden-Biebrich, Helmuth Keller, Ostrich-Winkel, and Hans Adolf Rohlfs and Wolfgang Dewald, Wiesbaden, Germany, assignors to Chemische Werke Albert, Wiesbaden-Biebrich, Germany, a corporation of Germany No Drawing. Application October 30, 1956
Serial No. 619,106

Claims priority, application Germany November 8, 1955

7 Claims. (Cl. 23—105)

This application relates to a new and improved process for the manufacture of aluminum phosphate.

In phosphoric acid technology the treatment of raw phosphate with acid is still by far the most common and economical method of bringing phosphoric acid bonded to lime into soluble form, either as phosphate fertilizers, as phosphoric acid itself, or as phosphoric acid compositions, which are further processed into phosphate chemicals. Thus, the production of phosphoric acid in any soluble form is burdened with the cost of the treatment acid. For instance, when using sulfuric acid, the acid is molecularly bound to the calcium of the raw phosphate and is lost in the form of gypsum. The treatment of raw phosphate with nitric acid represents a partial exception to this substantial loss of treatment acid. For example, a mixed fertilizer containing nitrogen and phosphoric acid can be produced from nitric acid without the loss of acid. However, nitric acid cannot be used to produce phosphoric acid or other phosphate products, as such, since no nitric acid treatment process has yet been evolved by which it is possible to separate economically the salts of nitric acid from those of phosphoric acid in the obtained mixtures.

It is apparent, therefore, that much would be gained in a saving in the consumption of acid alone provided soluble or readily separable phosphate compounds could be produced from raw phosphates by using an acid which had previously been used for another purpose, say, to obtain an acid derivative. Such a process would be particularly advantageous if a previously produced acid derivative, such as a salt, could subsequently be used in the treatment of the raw phosphate, as such, without having to be recovered and purified. In such a process the phosphoric acid content of the raw phosphate could be converted into a form which in many ways assures its most economical further processing, since the reaction products can be separated very economically from each other. For instance, such a process could permit either the immediate use of the treatment products as phosphate fertilizers, or the immediate further processing into phosphate chemicals, or the extraction of one of several byproducts from the previous use of the treatment acid for another purpose.

Now it has been found that aluminum phosphate can be produced in a simple and readily separable manner if finely divided calcium phosphates and the acid treatment solutions obtained from clay, aluminiferous materials, ferrous aluminiferous materials, alumina phosphates or ferrous alumina phosphates, or aqueous aluminum salt solutions of aluminum salts containing water of crystallization as obtained from such treatment solutions are mixed and the formed aluminum salts and the calcium phosphate reacted. The aluminum phosphate is obtained by heating the resulting mass, with stirring, at elevated temperatures sufficient to cause a reaction between the raw phosphate and the aluminum salt to take place. Where necessary, the heating may take place at superatmospheric pressures.

For instance, according to one embodiment of the invention, an aluminum salt, as obtained by the treatment of clay or like aluminiferous material, may be used in the process hereof. For example, an alkali aluminum silicate may be reacted with a mineral acid, as, for instance, hydrochloric acid, nitric acid, sulfuric acid or sulphurous acid, and thereby molecularly bind the acid as a mineral acid salt of aluminum. It is possible this reaction takes place according to the following equation:

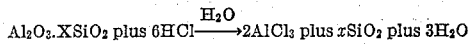

$$Al_2O_3 \cdot XSiO_2 \text{ plus } 6HCl \xrightarrow{H_2O} 2AlCl_3 \text{ plus } xSiO_2 \text{ plus } 3H_2O$$

An aqueous solution of the formed water soluble salt can then be converted with calcium phosphate into water insoluble aluminum phosphate which, under favorable conditions, precipitates and may thereby be separated from the residual calcium salt solution. Possibly this reaction takes place in accordance with the following equation:

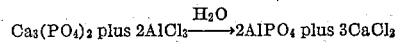

$$Ca_3(PO_4)_2 \text{ plus } 2AlCl_3 \xrightarrow{H_2O} 2AlPO_4 \text{ plus } 3CaCl_2$$

If the aluminiferous material is treated with nitric acid, instead of hydrochloric acid, aluminum nitrate is formed and can be correspondingly treated with calcium phosphate. In this instance a calcium nitrate solution develops in addition to the aluminum phosphate which, after separation as a filtrate from the insoluble aluminum phosphate, can be further processed into calcium nitrate and used as a nitrogen fertilizer. In this case, the nitric acid serves a two-fold purpose, one of which is the treatment of aluminum, and the other the treatment of the raw phosphate, and yet it is not lost but is contained in the calcium nitrate practically without loss.

On the other hand, when raw phosphates are used to convert aluminum sulfate solutions, such as obtained by the treatment of the above mentioned aluminiferous materials, with sulfuric acid, gypsum as well as aluminum phosphate normally would be formed as a precipitate. In this instance, the gypsum can be separated only with difficulty, or not at all, from the formed precipitated aluminum phosphate. For this reason, when using sulfuric acid as a treatment acid for clay or like aluminiferous materials, the obtained sulfate is used in excess quantities in the aqueous solution used for the conversion of the calcium phosphate. Here, too, the conversion takes place under stirring at elevated temperatures, and, where necessary, under elevated pressure. However, the aluminum phosphate formed in the presence of the excess aluminum sulfate is soluble in a hot solution at pH's up to 2.9. Thus, at the completion of the reaction the pH of the solution must not exceed 2.9. The formed gypsum can be filtered out of the solution with or without cooling. The aluminum phosphate still contained in the filtrate can be caused to precipitate out by heating and stirring the filtrate or by subsequently diluting the filtrate or by diluting, heating and stirring it.

When using aqueous solutions which contain, in addition to aluminum sulfate, aluminum salts of such acids which form water soluble calcium salts, as, for instance, aluminum chloride, solutions are first converted in a first step at an elevated temperature and, if necessary, under pressure, with a quantity of calcium phosphate corresponding to the aluminum sulfate part of the solution, whereby the aluminum phosphate formed dissolves in the other aluminum salt components and can be filtered from the gypsum which is formed. Subsequently, in a second step, the aluminum salt solution, or filtrate, also containing the aluminum phosphate is converted at an elevated temperature and, if necessary, under pressure, with additional calcium phosphate in a quantity which corresponds to the quantity of aluminum which is not bonded to the phosphate, whereupon the total aluminum phosphate formed is separated by filtration. The quantities of aluminum sulfate and aluminum salts of such acids which form water-soluble calcium salts, contained in the aqueous solution, can be chosen in such a manner that at most two-thirds of the aluminum is bonded to the sulfate and at least one-third of the aluminum is bonded to a radical of acids which form water-soluble calcium salts. Smaller quantities of aluminum salts of such acids which form water soluble calcium salts should not be used, since under such circumstances all of the aluminum phosphate formed in the first step will not dissolve in the remaining part of the aluminum salt.

The solubility of the tertiary aluminum phosphate in the aluminum salt components formed in the first step increases with the temperature. However, a re-precipitation does not take place in the cold. It is advantageous to operate in the first step in a strongly acid medium, preferably at a pH of 2 and less.

If calcium phosphates containing fluorine are used and it is desired to obtain a phosphate as free of fluorine as possible, it is advantageous to operate the process hereof in such a manner that after the two step conversion there is still a remainder of unconverted aluminum salts of acids which form water-soluble calcium salts.

Also, in accordance with various embodiments of this invention, when using phosphate containing calcium in excess of that contained in tricalcium phosphate, it is advantageous, in order to render the excess of calcium harmless, to add as much free acids as necessary to convert the excess of calcium into the corresponding calcium salt; for instance, according to the following equation:

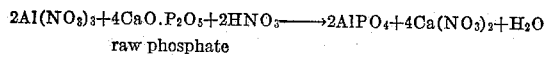
raw phosphate

In such reactions, the reaction mixtures may be heated sufficiently high to cause the aluminum phosphate to precipitate from the calcium nitrate solution in crystalline form, which is easier to separate from the calcium nitrate solution. If necessary, heating may take place under super-atmospheric pressure.

The yield of the conversion product increases also with the increase in temperature. If, for instance, the stoichiometric quantities of aluminum nitrate and nitric acid are converted in concentrated solution with raw phosphate only at a little over 100° C., the precipitate contains scarcely more than 2 to 3% lime and is, therefore, practically all aluminum phosphate. On the other hand, the calcium nitrate solution contains such small quantities of phosphoric acid and alumina that the yield of aluminum phosphate amounts to over 95%. If the conversion is done at temperatures of 200° C. the yield increases up to 100%.

Equivalent quantities of phosphoric acid and sulfuric acid can also be used as acids for the bonding of the excess calcium in the raw phosphate. In this case only stoichiometric quantity of aluminum salt need be used for the manufacture of the tertiary aluminum phosphate. However, the conversion of aluminum salts with a raw phosphate containing an excess of lime can also be carried out without the addition of mineral acids but in this case it is necessary to use, for instance, at least enough aluminum nitrate or the like such that the lime in the raw phosphate is converted into calcium nitrate. The following equation represents the reaction believed to take place:

$8Al(NO_3)_3 + 3Ca_3(PO_4)_2 + 3CaO \longrightarrow$
raw phosphate
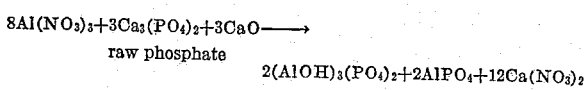

In this reaction, basic aluminum phosphates develop in addition to tertiary aluminum phosphate. Basic aluminum phosphates also develop when basic aluminum salt solutions are converted with tricalcium phosphate or raw phosphate according to the following equation:

$3AlOH(NO_3)_2 + Ca_3(PO_4)_2$
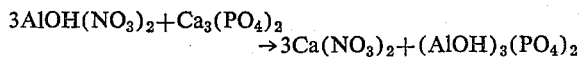

A great variety of alumina or aluminiferous raw materials may be used in this invention. If, for instance, ground leucite, a potash alumina having in the composition $K_2O.Al_2O_3.SiO_2$ is used, a treatment solution develops with nitric acid which, after conversion with raw phosphate, gives insoluble aluminum phosphate and also a solution containing potash and calcium nitrate. Also, aluminum phosphate adulterated with silica and lime can be used as raw materials. These are at first dissolved in an acid and the insoluble constituents (dead rock) are separated so that then the acid treatment solution obtained is converted with raw phosphate. The reaction may be represented by the following equation:

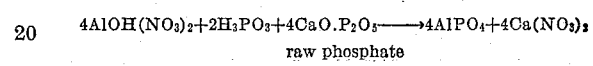
raw phosphate

In this way, a technically pure aluminum phosphate is obtained from a raw aluminum phosphate. The same applies to other low-grade phosphates as they are present in an adulterated form with lime, silica and ferric oxide as well as to alkali aluminum silicates as, for instance, nepheline.

It is further possible, according to the invention, to use treatment solutions with ferrous alumina materials whereby an ironless aluminum phosphate is obtained. The process is carried out in such a way that an acid aqueous ferrous aluminum salt solution is at first mixed, at an elevated temperature preferably between 50° and 100° C., and depending upon the content of the aluminum salt solution of $P_2O_5$, with a part of the total quantity of calcium phosphate required, preferably 0–80%, whereby, aside from the residue consisting mainly of dead rock, a clear solution is obtained. This solution is heated under pressure at temperatures up to 250° C., preferably 160–220° C., whereby under some suitable conditions of conversion nearly the total iron precipitates as iron phosphate and only comparatively small quantities of aluminum phosphate are precipitated with it. The ratio of Fe:Al in the precipitation is in all cases higher than in the solution. A solution is obtained which is almost free of iron and contains solely the aluminum salt and, as the occasion arises, the calcium salt of the acid and $P_2O_5$ used for the treatment of the ferrous alumina, or of the ferrous aluminum phosphate. This solution is heated with a corresponding quantity of calcium phosphate under stirring, and as the occasion arises, under pressure, as previously described, and is converted into pure aluminum phosphate and the corresponding calcium salt.

The last named process has the advantage that with the further processing of the aluminum phosphate, as for instance, with an alkaline conversion, no iron oxide hydrate develops which is difficult to filter.

The last named method of operation can also be carried out in such a manner that the process of introducing the calcium phosphate into the ferrous aluminum salt solution and the subsequent heating, under pressure, for the purpose of extracting the iron content is done in an autoclave in one working operation.

When using an aluminum phosphate containing iron it is advantageous to use a quantity of mineral acid for the treatment such that not all the iron phosphate but only the predominant part of same goes into solution. In such a treatment, the ratio Fe:Al becomes smaller than in the raw material since under these conditions there is a preference for the iron to remain as a residue. This type of treatment is carried out after adding the calcium phosphate. The iron-rich precipitation, as the occasion arises, together with the iron-rich residue of the treatment advantageously, is not subjected to an alkaline decomposition but, for instance, further processed into fertilizers or, according to the already suggested methods, into alkalipyrophosphate and/or alkalipyrophosphate-orthophosphate mixtures.

At times, it is highly desirable to obtain an especially pure aluminum orthophosphate.

In an important embodiment of this invention, described above, aluminum phosphate can be produced in a simple and readily separable manner if finely divided calcium phosphate and nitric, or hydrochloric, acid treatment solutions obtained from clay and other aluminiferous materials, or aqueous solutions of aluminum nitrate or aluminum chloride, containing water of crystallization, as obtained from such treatment solutions, are mixed and the aluminum salts and the calcium phosphate heated and reacted. Even in such reactions, however, a certain amount of $SiO_2$ and/or gypsum impurities contained in the calcium phosphate are present in the formed aluminum orthophosphate and are difficult to remove. Also, in such a process, a small amount of lime and fluorine are precipitated with the aluminum orthophosphate. Since the phosphoric acid content of the formed aluminum orthophosphate is almost twice as high as in low percentage calcium phosphate, the impurities in the gangue can increase to almost double the quantity in the aluminum orthophosphate.

Now, in accordance with an improved and refined practice of this invention, it has been found that especially pure tertiary aluminum orthophosphate is obtained by converting aqueous aluminum nitrate, or aluminum chloride solutions, not with stoichiometric quantities of calcium phosphate, but only with a part, say, close to about one-third to two-thirds, and preferably half of the stoichiometric quantity corresponding to the aluminum content of the solution. In this case, also, where there is an excess of calcium in the raw phosphate not bound to the $P_2O_5$, a mineral acid is advantageously added to neutralize such excess calcium. The tertiary aluminum orthophosphate formed in the conversion goes into solution in the aluminum salt solution used in excess while the impurities, such as $SiO_2$ and/or gypsum, are separated by filtration from the aluminum orthophosphate part which is in solution. The filtrate, which in addition to the aluminum salt components used in excess, contains in solution the calcium salt corresponding to the anion of the aluminum components and the aluminum orthophosphate formed, is subsequently heated to higher temperatures, whereby the aluminum orthophosphate in solution precipitates quantitatively in a very pure form. If desired, and advantageous, the filtrate may be diluted and heated under pressure in precipitating the aluminum orthophosphate.

After separation of the precipitated aluminum orthophosphate, the remaining filtrate, which contains in solution the aluminum salt used in excess and the formed calcium salt, is used as such for a new process. Alternately, after enrichment of the calcium salts the calcium salts are removed, for instance, by the addition of sulphuric acid or aluminum sulfate. Thus the remaining aluminum salt solution is used again for the conversion with calcium phosphates.

It is entirely possible to dissolve larger quantities of aluminum orthophosphate in water soluble aluminum salt solutions. Thus, for instance, in 0.5 molecular aluminum salt solutions the maximum solubility of aluminum orthophosphate at 90–95° C. amounts to more than 3.5 mol aluminum orthophosphate to 1 mol aluminum nitrate and more than 4.5 mol aluminum orthophosphate to 1 mol aluminum chloride. This extreme solubility of aluminum orthophosphate cannot be utilized in aluminum salt solutions in this invention due to the colloidal nature of the solution which leads to increased viscosity as the concentration of aluminum orthophosphate increases and thereby impedes the separation of impurities from the solution. The maximum solution equilibria mentioned are dependent not only upon the presence of dissolved calcium salts but also upon other factors as, for instance, the concentration, temperature and the pH value of the solution.

If the solution of formed aluminum orthophosphate obtained after conversion of aqueous aluminum salt solutions with the one-third to two-third stoichiometric quantities of calcium phosphates is heated to boiling together with the excess of added aluminum salt components and the formed calcium salts, tertiary aluminum orthophosphate with 2 mol water of crystallization precipitates from this solution. If, however, the work is done at higher temperature and, therefore, under use of pressure, aluminum orthophosphate precipitates without water of crystallization and is very easily filtered out.

The yield of aluminum orthophosphate in the thermal decomposition of the solution equilibria depends upon several factors, such as concentration, temperature, and pH value of the solution, as well as upon the quantity of the aluminum salt added in excess, but also upon the duration of the superheating. The yield and the reaction speed are highest when the excess of water soluble aluminum salt containing the aluminum orthophosphate in aqueous solution and the concentration of the solution are as small as possible and the pH value is as high as possible. If, for instance, in the pH range between 2.0 and 3.0, a solution, wherein less than 10% $Al_2O_3$ of the aluminum salt components is dissolved, is heated for 2–3 hours to 120–250° C., preferably 160–200° C. until equilibrium is obtained, the yield in aluminum orthophosphate, in relation to the $P_2O_5$ content of the solution, amounts to 90% and more.

The mother liquor obtained after separation of the precipitated aluminum orthophosphate can be further processed in various ways. In accordance with a procedure previously described, a quantity of raw phosphate equivalent to the aluminum salt is added to the mother liquor and this mixture, likewise under addition of the quantity of mineral acid required for the neutralization of the excess of calcium content in the raw phosphate not bonded to $P_2O_5$, is heated to the temperature required for the formation of the aluminum orthophosphate. With this, to be sure, an aluminum orthophosphate is obtained which contains the impurities of the raw phosphate. In order to reduce these impurities to a minimum, it is suitable to choose for the conversion of the mother liquor a high percentage raw phosphate as, for instance, Morocco phosphate or Colaapatit. However, the part of the aluminum orthophosphate so obtained is hardly of importance as against the orthophosphate obtained from the mother liquor in the first stage of the reaction just described, since in this stage 90% and more of a technically pure aluminum orthophosphate can be obtained. After conversion in the manner described of the mother liquor with raw phosphate, the remaining mother liquor is practically free of aluminum and phosphoric acid; it contains about 1 g. $Al_2O_3$ or $P_2O_5$ per liter and contains practically only the calcium salt corresponding to the acid radical of the used aluminum salt.

However, one can also proceed by using the mother liquor obtained together with further quantities of dissolved aluminum salts for carrying out the process according to the invention for the conversion with stoichiometric quantities of calcium phosphates. In such a procedure, in order to avoid an excessive enrichment of the calcium salts, it is advisable, as already mentioned, to precipitate the calcium part by the addition of sulfuric acid, or more suitably, aluminum sulfate, as gypsum.

As already mentioned, by making use of the high solubility of aluminum orthophosphate in aluminum chloride, or aluminum nitrate, solutions, an especially pure aluminum orthophosphate is obtained which cannot be manufactured according to other known processes. Products are obtained which, based upon dehydrated aluminum orthophosphate, contain up to 42% $Al_2O_5$ and 56% $P_2O_5$. The impurities in fluorine and silica amount to less than 0.1%. The aluminum orthophosphate obtained usually is completely free from lime and is, therefore, excellently adapted for the further processing to pure alumina and alkali phosphates.

Likewise, aluminum phosphates manufactured according to other embodiments of this invention can be dissolved in alkali solution whereby simultaneously alkali phosphates and alumina are obtained. With further processing of the alumina, aluminum is obtained.

The following examples will serve to further illustrate the invention.

Example 1

Seven hundred fifty (750) ccm. of an aluminum chloride solution, manufactured by dissolving a technical aluminum chloride of the formula $AlCl_3.6H_2O$ in diluted hydrochloric acid and containing: 138 g. $AlCl_3$ (correspondingly 52.5 g. $Al_2O_3$ and 32.5 g. HCl) and 217 g. of a finely ground Morocco phosphate (33.6% $P_2O_5$ and 51.8% CaO) are mixed and heated under stirring in an autoclave for two hours to about 200° C. The final product is filtered, washed hot with water and dried. One hundred forty-five (145) g. of aluminum phosphate of the following composition are recovered:

| | Percent |
|---|---|
| $Al_2O_3$ | 35.9 |
| $P_2O_5$ | 46.6 |
| CaO | 1.5 |
| Loss from heating | 9.4 |

The filtrate and the wash water are practically free of aluminum and phosphoric acid and contain only the lime, or calcium, of the raw phosphate as calcium chloride.

Example 2

Two hundred seventy (270) g. of a moist aluminum nitrate, which was recovered by the precipitation of a nitric acid treatment of clay with concentrated nitric acid and consists of 238 g. aluminum nitrate $Al(NO_3)_3.9H_2O$ and 13 g. $HNO_3$ and 19 g. $H_2O$ (moisture), is mixed with 115 g. of a very finely ground colaphosphate and heated in an autoclave for two hours under stirring to about 200° C. The reaction product is soaked out hot with water, washed and dried. Eighty-five (85) g. of an aluminum phosphate of the following composition are recovered:

| | Percent |
|---|---|
| $Al_2O_3$ | 35.1 |
| $P_2O_5$ | 50.9 |
| CaO | 2.3 |

The filtrate is free of aluminum and phosphoric acid and contains the total quantity of the nitric acid used and almost 98% of the lime of the raw phosphate in the form of calcium nitrate.

Example 3

Two (2) liters of a nitric acid treatment solution of a Senegal aluminum phosphate which contains:

| | G. |
|---|---|
| $Al_2O_3$ | 270 |
| $Fe_2O_3$ | 74 |
| CaO | 82 |
| $HNO_3$ | 1090 |
| $P_2O_5$ | 248 | is heated with 785 g. of a chalk phosphate (with 24.69% $P_2O_5$ and 51.2% CaO) in an autoclave for a few hours under stirring to 160–180° C. The reaction product is filtered, washed out and dried. Seven hundred ninety (790) g. of an aluminum iron phosphate are recovered having the following percentage composition:

| | Percent |
|---|---|
| $Al_2O_3$ | 32.10 |
| $Fe_2O_3$ | 9.35 |
| $P_2O_5$ | 52.00 |
| CaO | 1.98 |

The filtrate and the wash water are free of iron, aluminum and phosphoric acid and contain after their fusion a total of 1377 g. calcium nitrate which are recovered by evaporation of the solution in a dehydrated form.

Example 4

Six (6) liters of the nitric acid treatment solution of leucite (with 400 g. $Al_2O_3$ plus 320 g. $K_2O$) are heated for three hours under stirring in a closed vessel to 160–170° C. with 1.7 kg. of finely ground Morocco phosphate. The reaction mixture, which consists of potassium and calcium nitrate in solution and aluminum phosphate as precipitate, is filtered. The separated aluminum phosphate is washed out and dried.

Yield of aluminum phosphate: 1040 g.

Composition:

| | Percent |
|---|---|
| $Al_2O_3$ | 36.7 |
| $P_2O_5$ | 52.7 |
| $Fe_2O_3$ | 2.8 |
| CaO | 0.9 |
| Loss through heating | 6.2 |

According to this composition the yield is about 96%. The aluminum phosphate recovered contains the phosphoric acid in a citrate-soluble form and is, therefore, useable as phosphate fertilizer, especially as component of any complete fertilizer or can be further processed into alumina and other phosphorus salts. The potassium-calcium nitrate solution obtained, which is free of alumina and contains only traces of phosphoric acid, is processed in a known manner into potassium and calcium nitrate.

Example 5

This example is concerned with obtaining aluminum phosphate of higher purity than obtained in the preceding example.

Six (6) liters of the treatment solution of leucite are diluted with concentrated nitric acid. With this, about 75% of the aluminum nitrate contained therein is extracted which is separated and is washed with a little concentrated nitric acid.

Yield: 2.19 kg. aluminum nitrate of the formula $Al(NO_3)_3 \cdot 9H_2O$.

The total quantity of this nitric acid salt is melted in its water of crystallizaiton, mixed with 1260 g. Morocco phosphate and brought into reaction boiling hot, under ordinary pressure, without the water contained therein evaporating.

The reaction product is washed with water whereby the calcium nitrate dissolves from it and aluminum phosphate remains. The aluminum phosphate is separated, washed and dried.

Yield: 780 g.

Composition:

| | Percent |
|---|---|
| $Al_2O_3$ | 37.0 |
| $P_2O_5$ | 53.0 |
| CaO | 0.8 |
| $Fe_2O_3$ | 0.3 |
| Loss through heating | 5.5 |

A solubilizing of this aluminum phosphate with caustic soda gives only a minimum insoluble residue of calcium phosphate and iron hydroxide. The potassium-calcium nitrate solution, which contains only traces of phosphoric acid, is processed in a known manner into the products previously mentioned.

Example 6

One hundred (100) kg. of a Morocco calcium phosphate are fed in an open stirrer vessel into 630 liters of an aluminum sulfate solution which contains 350 g. $Al_2(SO_4)_3$. Under constant stirring, and while replacing evaporated water, the reaction mixture is held for five hours at boiling temperature. At the end of the reaction, the pH value of the reaction mixture must be between 2.5 and 2.9 but must not exceed 2.9. Directly after completion of the reaction, the gypsum formed is filtered hot and washed with sulphuric acid water. The wash water can be used for the next batch.

A sample of the gypsum, which after drying at 105° C., amounts to 125 kg., has the following composition:

|   | Percent |
|---|---|
| CaO | 38.1 |
| $P_2O_5$ | 9.96 |
| $SO_3$ | 53.1 |
| $Al_2O_3$ | 1.3 |

The filtrate, which is still hot, is diluted with water to double its quantity, heated to boiling, and the aluminum phosphate is stirred out. It precipitates in a form which can be filtered readily and is washed with water. After drying at 105° C. 68.5 kg. of an aluminum phosphate remain with the following composition:

|   | Percent |
|---|---|
| $P_2O_3$ | 43.00 |
| $SO_3$ | 0.54 |
| $Al_2O_3$ | 32.91 |
| CaO | 0.11 |

The remaining aluminum phosphate can be removed from the filtrate of the aluminum phosphate precipitation, if desired, by diluting it to 2 to 5 times the original volume, or can be used immediately for a new batch for dissolving the aluminum sulfate.

Example 7

A composition containing:

33.3 g. $Al_2(SO_4)_3 \cdot 18H_2O = 5.1$ g. $Al_2O_3$
24.1 g. $AlCl_3 \cdot 6H_2O = 5.1$ g. $Al_2O_3$
21.2 g. Morocco phosphate=7.1 g. $P_2O_5$, 11.06 g. CaO
30 ccm. water after the addition of a quantity $H_2SO_4$ corresponding to the excess CaO, was heated for some time at 100–120° C. The washed residue=29.4 g. contained:

$Al_2O_3$: 0.34% = 0.1 g. = 0.98% of the charge
$P_2O_5$: 0.34% = 0.1 g. = 1.40% of the charge The solution, containing 10.1 g. $Al_2O_3$ and 7.0 g. $P_2O_5$, was heated for some time to 150–180° C. with 21.2 g. Morocco phosphate as well as a quantity HCl corresponding to the excess CaO and drained off hot. Twenty-two and 45/100 (22.45) g. of a final product were obtained with the following composition:

$Al_2O_3$: 43.2% = 9.7 g. = 96% of the charge
$P_2O_3$: 54.4% = 12.3 g. = 87% of the charge
CaO: 0.0%
Loss from heating 1.9%

Example 8

A composition containing:

33.3 g. $Al_2(SO_4)_3 \cdot 18H_2O = 5.1$ g. $Al_2O_3$
37.5 g. $Al(NO_3)_3 \cdot 9H_2O = 5.1$ g. $Al_2O_3$
21.2 g. Morocco phosphate=7.1 g. $P_2O_5$
11.06 g. CaO
33 ccm. water after the addition of a quantity $H_2SO_4$ corresponding to the excess of CaO over tricalcium phosphate, was treated as in Example 7.

A residue of 30.8 g. was obtained containing:

$Al_2O_3$: 0.77% = 0.237 g. = 2.32% of the charge
$P_2O_5$: 0.018% = 0.005 g. = 0.08% of the charge The solution containing 10 g. $Al_2O_3$ and 7 g. $P_2O_5$ was further converted as shown in Example 7, with 21 g. Morocco phosphate and a quantity of $HNO_3$ corresponding to the excess CaO.

A final product of 28.6 g. was obtained with the following composition:

$Al_2O_3$: 34.7% = 9.93 g. = 97.3% of the charge
$P_2O_5$: 47.7% = 13.65 g. = 97.0% of the charge
CaO: 2.47%
Loss from heating 9.5%

Example 9

Twenty (20) ml. of an aqueous solution of $Fe(NO_3)_3$ and $Al(NO_3)_3$ containing 0.917 g. $Fe_2O_3$, 1.364 g. $Al_2O_3$ and 1.508 g. $NO_3$ nitrogen are heated for two hours in an autoclave at 180° C. with 2.608 g. tricalcium phosphate {containing 41.6% $P_2O_5$ and 48.6% CaO=mol. ratio $(Al_2O_3$ plus $Fe_2O_3):P_2O_5=0:0.4$}. After cooling the precipitation obtained is separated by centrifugation and dried at 100° C.

A residue of 2.617 was obtained containing:

0.885 g. $P_2O_5$ corresponding to 78.7% of the quantity of $P_2O_5$ used
0.2695 g. $Al_2O_3$ corresponding to 19.8% of the quantity of $Al_2O_3$ used
0.896 g. $Fe_2O_3$ corresponding to 97.8% of the quantity of $Fe_2O_3$ used A solution of 21.931 g. was obtained, containing:

0.0221 g. $Fe_2O_3$ corresponding to 2.4% of the quantity of $Fe_2O_3$ used.

The quantity of calcium phosphate still needed is added to the almost iron-free solution and the mixture heated to 200° C. whereupon aluminum phosphate and calcium nitrate are separated as disclosed previously.

Example 10

One hundred (100) g. calcined aluminum phosphate containing:

|   | Percent |
|---|---|
| $P_2O_5$ | 34.6 |
| $Al_2O_3$ | 36.0 |
| $Fe_2O_3$ | 11.2 |
| CaO | 10.5 |
| $Na_2O$ | 1.21 |
| $TiO_2$ | 2.0 |
| $SiO_2$ | 3.0 | are boiled for one hour in the reflux condenser with 109.1 g. 76% nitric acid and 216.5 g. water. The solution (309.3 g.) separated by centrifugation from the conversion residue, contains:

29.84 g. $P_2O_5$ corresponding to 86.3% of the quantity of $P_2O_5$ used
30.0 g. $Al_2O_3$ corresponding to 83.3% of the quantity of $Al_2O_3$ used.
9.29 g. CaO corresponding to 88.4% of the quantity of CaO used
6.21 g. $Fe_2O_3$ corresponding to 55.5% of the quantity of $Fe_2O_3$ used
16.70 g. nitrate N=90.6% of the quantity of nitrate used.

0.8545 g. Morocco phosphate containing:

|   | Percent |
|---|---|
| CaO | 52.0 |
| $Fe_2O_3$ | 0.26 |
| $Al_2O_3$ | 0.52 |
| $Na_2O$ | 0.96 |
| $P_2O_5$ | 33.4 |
| F | 3.5 |
| $SO_3$ | 1.8 | are added to 40 g. of the obtained solution. Then this mixture is heated for two hours in an autoclave at 170° C. After cooling, the precipitate is separated by centrifugation and dried at 100° C.

The precipitate (5.0 g.) contains:

1.89 g. $P_2O_5$, corresponding to 45.7% of the quantity of $P_2O_5$ introduced for heating
1.156 g. $Al_2O_3$, corresponding to 29.8% of the quantity of $Al_2O_3$ introduced for heating, and
0.770 g. $Fe_2O_3$, corresponding to 95.9% of the quantity of $Fe_2O_3$ introduced for heating.

The solution obtained in this step (30.20 g.) still contains 0.0313 g. $Fe_2O_3$ corresponding to 3.9% of the quantity used for heating in this step.

A quantity of Morocco phosphate, still necessary for the complete conversion, is added to the solution and the mixture heated under pressure to 200° C. etc.

It can be seen from the data that 58.5% of the aluminum originally used in the form of ferrous aluminum phosphate are recovered as almost iron-free aluminum phosphate (weight ratio $Al_2O_3:Fe_2O_3 = 98.8:1.2$).

*Example 11*

One hundred (100) g. calcined aluminum phosphate (see Example 10) are boiled for one hour in a reflux condenser with 74.5 g. 76% $HNO_3$ and 251.1 g. $H_2O$. The solution (267.4 g.), separated by centrifugation from the conversion residue, contains:

24.14 g. $P_2O_5$, corresponding to 69.7% of the quantity of $P_2O_5$ used
24.32 g. $Al_2O_3$, corresponding to 67.6% of the quantity of $Al_2O_3$ used
5.26 g. $Fe_2O_3$, corresponding to 47.0% of the quantity of $Fe_2O_3$, used
8.15 g. CaO, corresponding to 77.6% of the quantity of CaO used
11.21 g. nitrate N, corresponding to 89.4% of the quantity of nitrate N used Thirty (30) g. of this treatment liquor are heated for two hours under pressure to 220° C. After cooling, the precipitate is separated by centrifugation and dried at 100° C.

The precipitate (5.11 g.) contains:

1.99 g. $P_2O_5$, corresponding to 73.5% of the $P_2O_5$ content of the treatment liquor
1.53 g. $Al_2O_3$, corresponding to 56.0% of the $Al_2O_3$ content of the treatment liquor
0.574 g. $Fe_2O_3$, corresponding to 97.0% of the $Fe_2O_3$ content of the solution The solution (20.486 g.) contains:

0.0154 g. $Fe_2O_3$, corresponding to 2.6% of the $Fe_2O_3$ content of the treatment liquor.

*Example 12*

Four thousand five hundred (4500) ccm. of a solution obtained by the nitric acid decomposition of leucite and containing 486 g. $Al_2O_3$ and 540 g. $NO_3$ nitrate N, were converted under stirring and refluxing with 1015 g. Morocco phosphate (338 g. $P_2O_5$). The solution containing 4750 ccm. (including washing fluid) filtered off from the insoluble residue, contained: 461 g. $Al_2O_3$, 337 g. $P_2O_5$, 532 g. $NO_3$ nitrate N.

One (1) liter of this solution, containing 97 g. $Al_2O_3$, 71 g. $P_2O_5$ and 112 g. $NO_3$ nitrate N, was heated for some time in the autoclave to 180° C. The precipitate formed was sucked off, washed and dried at 110° C. One hundred sixteen (116) g. of a white crystalline product were obtained with the following composition:

$Al_2O_3: 41.25\% = 47.8$ g. $= 49.4\%$ yield
$P_2O_5: 55.90\% = 64.9$ g. $= 91.5\%$ yield
$Fe_2O_3: 1.20\%$
CaO: 0.00%
F: 0.09%
$SiO_2: 0.10\%$
Loss from heating 1.90%

*Example 13*

Four thousand seven hundred (4700) ccm. of a solution obtained by hydrochloric acid decomposition of leucite and containing 460 g. $Al_2O_3$, 1300 g. Cl were converted with 958 g. raw phosphate (320 g. $P_2O_5$) as described in Example 12. In the filtrated solution of 5000 ccm. was found:

| | G. |
|---|---|
| $Al_2O_3$ | 446 |
| $P_2O_5$ | 316 |
| Cl | 1276 |

One (1) liter of this solution, containing 89.2 g. $Al_2O_3$, 63.2 g. $P_2O_5$, 255.2 g. Cl, was heated under pressure to 180° C. The white precipitate developed was sucked off, washed and dried at 100° C. The following was obtained:

$Al_2O_3: 40.60\% = 43.9$ g. $= 49.3\%$ of the dissolved quantity
$P_2O_5: 54.40\% = 58.7$ g. $= 93.0\%$ of the dissolved quantity
$Fe_2O_3: 1.03\%$
CaO: 0.00%
F: 0.12%
$SiO_2: 0.10\%$
Loss from heating 3.00%

While the foregoing description sets forth numerous details and examples to illustrate the practice of the invention, it will be understood that these details may be varied widely without departing from the scope or spirit of the invention which is intended to be defined in the disclosed claims.

We claim:

1. A process for producing aluminum phosphate, comprising mixing (1) a calcium phosphate, and (2) an acid aqueous solution comprising (*a*) hydrous aluminum sulfate in a quantity sufficient to react with said calcium phosphate to convert it to aluminum phosphate and (*b*) at least one hydrous aluminum salt of another mineral acid selected from the group consisting of hydrochloric acid and nitric acid in a quantity which renders the aluminum phosphate formed from said calcium phosphate soluble in the aqueous reaction medium, stirring and heating the formed mixture at elevated temperatures until said calcium phosphate is reacted with said aluminum sulfate to form aluminum phosphate dissolved in the aqueous solution, separating insoluble by-product calcium sulfate from the aqueous solution, then adding to the resulting aqueous solution an additional quantity of calcium phosphate in an amount sufficient to react with said aluminum salt of said mineral acid, and stirring and heating the resulting mixture in the manner aforesaid until said additional quantity of calcium phosphate is converted to aluminum phosphate, and separating the resulting insoluble aluminum phosphate as a precipitate.

2. A process for producing aluminum phosphate, comprising mixing (1) an acid aqueous solution of aluminum sulfate containing water of crystallization and obtainable from the sulfuric acid treatment of an aluminiferous material, and (2) a finely divided calcium phosphate in an amount insufficient to react with all of said aluminum sulfate to form aluminum phosphate, stirring and heating such a mixture until a reaction between the calcium phosphate and the aluminum sulfate takes place to form aluminum phosphate and calcium sulfate and thereby form an aqueous solution having a pH not exceeding 2.9 containing residual unreacted aluminum sulfate and dissolved aluminum phosphate, separating the aqueous solution containing the formed and still dissolved aluminum phosphate from formed insoluble calcium sulfate, and continuing the heating and stirring of the aqueous solution separated from calcium sulfate until aluminum phosphate is precipitated and separating the precipitated aluminum phosphate from the aqueous solution.

3. A process for producing aluminum phosphate, comprising mixing (1) an acid aqueous solution of (a) a ferrous salt of a mineral acid and (b) an aluminum salt of a mineral acid both obtained from the mineral acid treatment of a ferrous aluminiferous material, and (2) up to 80% of the quantity of calcium phosphate necessary to convert said aluminum salt into aluminum phosphate, heating the formed mixture at elevated temperatures above the boiling point of water and at the developed superatmospheric pressure until said calcium phosphate is converted to aluminum phosphate, separating the formed precipitate, adding calcium phosphate to the residual aqueous solution in an additional quantity sufficient to react with the residual aluminum salt of the mineral acid, stirring and heating the mixture formed with the residual aqueous solution in the manner aforesaid until said additional calcium phosphate is converted to aluminum phosphate and separating insoluble aluminum phosphate from the filtrate.

4. A process for producing aluminum orthophosphate, comprising mixing (1) an acid aqueous solution of an aluminum salt obtainable from an aluminiferous material and containing water of crystallization selected from the group consisting of aluminum nitrate and aluminum chloride, and (2) a finely divided calcium phosphate in quantity between about ⅓ and ⅔ of the quantity stoichiometrically necessary to react with said aluminum salt to form aluminum phosphate, stirring and heating said mixture until a reaction between said calcium phosphate and said aluminum salt takes place to form aluminum orthophosphate and a calcium salt corresponding to said salt of aluminum thereby forming an aqueous solution containing the formed aluminum orthophosphate and the excess of said aluminum salt, separating the formed aqueous solution from insoluble impurifying materials, heating said separated formed solution at a higher temperature to precipitate aluminum orthophosphate in a highly purified state and separating the aluminum orthophosphate from said formed solution.

5. A process as defined in claim 4, in which the quantity of calcium phosphate is about ½ of the quantity stoichiometrically required to react with said aluminum salt.

6. A process as defined in claim 4, in which a mother liquor separated from the precipitated aluminum orthophosphate is treated to remove the dissolved calcium salt corresponding to the salt of aluminum, and then mixed with further quantities of calcium phosphate to produce aluminum phosphate.

7. A process as defined in claim 4, in which a calcium phosphate is used containing calcium in excess of that bonded to $P_2O_5$ and in which said excess is neutralized by forming a calcium salt of a mineral acid.

References Cited in the file of this patent
UNITED STATES PATENTS

| | | |
|---|---|---|
| 252,029 | Gibbons et al. | Jan. 10, 1882 |
| 276,143 | Knight | Apr. 17, 1883 |
| 2,769,686 | McCullough et al. | Nov. 6, 1956 |
| 2,783,140 | Hignett et al. | Feb. 26, 1957 |